United States Patent [19]

Ogura

[11] Patent Number: 5,563,485
[45] Date of Patent: Oct. 8, 1996

[54] EQUALIZING MECHANISM IN HOME-POSITIONING APPARATUS

[75] Inventor: Naoyuki Ogura, Shizuoka, Japan

[73] Assignee: Tenryu Technics Co., Ltd., Shizuoka, Japan

[21] Appl. No.: 377,158

[22] Filed: Jan. 24, 1995

[30] Foreign Application Priority Data

Jan. 25, 1994 [JP] Japan .................. 6-006191

[51] Int. Cl.$^6$ .............. G12B 5/00; H05K 13/00
[52] U.S. Cl. ................ 318/626; 318/696; 355/235
[58] Field of Search .................. 318/560–646; 355/235, 39, 75, 203, 55, 50, 233, 235; 174/69; 209/53; 235/379; 194/212, 205, 906, 217; 221/88; 414/273, 277, 225; 425/139; 264/334

[56] References Cited

U.S. PATENT DOCUMENTS

| 3,529,481 | 9/1970 | Budzyn . | |
|---|---|---|---|
| 4,371,254 | 2/1983 | Beery | 355/8 |
| 4,386,842 | 6/1983 | Beery | 355/8 |
| 4,500,197 | 2/1985 | Dannatt | 355/8 |
| 4,561,771 | 12/1985 | Sugiura | 355/14 R |
| 4,568,171 | 2/1986 | Ikenoue | 355/8 |
| 4,789,054 | 12/1988 | Shore et al. | 194/212 |
| 4,812,629 | 3/1989 | O'Neil et al. | 235/383 |
| 4,858,743 | 8/1989 | Paraskevakos et al. | 194/205 |

FOREIGN PATENT DOCUMENTS

| 0026724 | 4/1981 | European Pat. Off. . |
| 0359344 | 3/1990 | European Pat. Off. . |

*Primary Examiner*—Paul Ip
*Attorney, Agent, or Firm*—McCormick, Paulding & Huber

[57] ABSTRACT

The equalizing mechanism includes: timing belts laid in parallel to the rails for moving on a base; timing pulleys engaged with the timing belts; timing pulleys for interlocking mounted on shafts of the timing pulleys; and a timing belt for interlocking racked between the timing pulleys for interlocking whereby, when the movable beam on the rails for moving is driven, a driving force given by the rotation between the timing belt and the timing pulley on one side is equalized to be transmitted to the timing belt and the timing pulley on the other side through the timing pulley for interlocking, the timing belt for interlocking and the timing pulley for interlocking.

5 Claims, 5 Drawing Sheets

EQUALIZING MECHANISM IN HOME-POSITIONING APPARATUS

BACKGROUND OF THE INVENTION

1. Field of the Invention

This invention relates to an equalizing mechanism in a home-positioning apparatus, and more particularly to a technique effective for application to an equalizing mechanism in a home-positioning apparatus, which is used in an X-Y home-positioning apparatus for a chip mounter, a dispenser or the like for example, wherein equalization of a driving force acting on a movable member driven on a pair of rails for moving can be performed.

2. Related Art Statement

In general, a home-positioning apparatus is of such an arrangement that a movable beam, which can move only in the Y-direction, is provided to have opposite end portions thereof supported by saddles which are movably engaged with rails for moving in the longitudinal direction (hereinafter referred to as a "Y-direction"), said rails being provided at opposite sides of a base of a machine, and that, in the movable beam, rails for moving in the lateral direction (hereinafter referred to as an "X-direction") are provided along the longitudinal direction of the movable beam and a carriage is racked between the rails to move only in the X-direction.

Then, an electronic parts mounting head of a chip mounter or the like is mounted on this carriage, and a so-called X-Y home-positioning robot system to perform the operation such as mounting is adopted, in which the movable beam and the carriage are moved and home-positioned in the X-direction and Y-direction respectively, by a numerical control means, and moved to determined positions thereof relative to a print circuit board and the like which are home-positioned by another means on the base of the machine.

This movable beam is normally driven by a servo-motor, which is numerically controlled through a ball screw and the like. However, in view of the characteristics an construction of the machine, it is impossible to drive the movable beam by giving force to the central portion or thereabout. Therefore, it is inevitable to provide the ball screw and the like to drive an end portion of the movable beam, and generally, such a system is adopted that one end portion or thereabout of the movable beam is driven by a ball screw to move and home-position the movable beam in the Y-direction.

However, in the above-described technique, since only one end portion of the movable beam is driven in the Y-direction, a turning force is generated in the horizontal plane by the acceleration at the time of moving and home-positioning, whereby the perpendicularity of the movable beam to the moving direction, i.e., the perpendicularity of the moving direction (X-direction) of the carriage racked on the movable beam to the moving direction (Y-direction) of the movable beam is impaired, whereby the reliability of home-positioning is reduced. Further, a high moment is applied to the saddles for supporting the movable beam, particularly the saddle on the driving side, so that an excessive load is applied to linear bearings and the like, which are normally used in this portion, to present a disadvantage of quickening deterioration, thereby presenting a large obstruction to making the mounting at higher speed, which is notable particularly recently.

To obviate the above-described disadvantages, such a measure has heretofore been adopted that a plurality of linear bearings having high capacity are provided at intervals in order to increase the anti-moment characteristics of the saddles (particularly one on the driving side). However, the costs are high, and moreover, the linear bearings and the like are provided apart from one another in the Y-direction, whereby it becomes difficult to increase the rate of the moving value of the movable beam to the total length of the rails for moving, and the dimensions of effective moving to the outer dimensions of the machine are restricted. Furthermore, because of the one side driving mechanism, it is difficult to eliminate such a disadvantage that the amplitude of vibrations at the time of home-positioning and the time of convergence are greatly increased at a portion close to the opposite side to the driving side, as compared with a portion close to the driving side.

In contract thereto, such a system is partially adopted that two sets of servo-motors and ball screws are used to drive opposite end portions of the movable beam. However, the costs are higher and such a disadvantage is presented that, in order to operate in synchronism the two servo-motors stably without being influenced by a transient phenomenon, unbalanced interference of an external force and the like, it is necessary to use a complicated and expensive control system.

SUMMARY OF THE INVENTION

It is an object of the present invention to provide an equalizing mechanism in a home-positioning apparatus, wherein the above-described disadvantages are eliminated, a driving force acting on a movable member driven on a pair of rails for moving is equalized to be transmitted, and the reliability of home-positioning can be improved without the perpendicularity between the X-direction and the Y-direction being impaired during the driving of the movable member.

The abode-described and other objects, and novel feature of the present invention will become apparent more fully from the description of the specification in conjunction with the accompanying drawings.

The following is a brief description of the outline of typical one out of the inventions disclosed in the present application.

That is, an equalizing mechanism in a home-positioning apparatus according to the present invention is applied to a home-positioning apparatus, wherein a movable member is fixed to a pair of moving members which are movably engaged with a pair of rails for moving; a pair of transmitting means having respective fixed opposite ends are laid in parallel to the pair of rails respectively; a pair of engageable means rotatably supported on the movable member are engaged between said respective fixed ends of the pair of transmitting means; a pair of engageable means for interlocking are fastened to respective shafts of the pair of engageable means respectively; and a transmitting means for interlocking is racked between the pair of engageable means for interlocking, whereby the respective transmitting means and engageable means are provided in a substantially symmetrical construction with the pair of rails for moving.

In this case, a driving means is provided on one side of the pair of rails of the movable member, so that the movable member can be driven along the pair of rails for moving.

Furthermore, for obtaining strong engagement between the pair of transmitting means and the pair of engageable means, a pair of tensile means are provided in the laying direction of each of the pair of transmitting means.

Further, in order to move the movable member and an acting member in the X-direction and Y-direction, respectively, a pair of rails in the perpendicular direction are provided on the movable member in parallel to the perpendicular direction to the moving direction of the movable member, a pair of moving members in the perpendicular direction are movably engaged with this pair of rails for moving in the perpendicular direction, respectively, and the acting member is fixed to this pair of moving members in the perpendicular direction.

Timing belts having no slip and backlash are used as the pair of transmitting means and the transmitting means for interlocking, timing pulleys having no slip and backlash and engaged with the timing belts are used as the pair of engageable means and the engageable means for interlocking, and further, a ball screw driven by a servo-motor is used as the driving means.

Particularly, when this home-positioning apparatus is used for a chip mounter, a dispenser or the like, a head of the chip mounter or a head of dispenser is fixed to the acting member, and this head is moved and home-positioned in the X-direction and Y-direction.

In the above-described equalizing mechanism in the home-positioning apparatus, the pair of transmitting means and the pair of engageable means for interlocking such as the timing belts, and the pair of engageable means and the engageable means for interlocking such as the timing pulleys are provided symmetrically with one another, whereby, when the movable member including linear bearings is driven along the pair of rails, a driving force given by the rotation of one of the engageable means engaged with one of the transmitting means, is equalized to be transmitted to the other of the engageable means engaged with the other of the transmitting means, through one of the engageable means for interlocking, the transmitting means for interlocking and the other of the engageable means for interlocking.

With this arrangement, even when the driving means, such as the ball screw driven by the servo-motor, is provided in only one side of the rails, i.e., one side of the movable member, the both sides of the movable member can be driven by the equalized driving force, so that the perpendicularity is not impaired during the driving of the movable member, and that the moment applied to the driving side can be suppressed.

Furthermore, when the pair of tensile means are provided in the respective laying directions of the transmitting means, the engagement between the transmitting means and the engageable means is made to be strong by the pair of tensile means, and tensions of predetermined values can be applied to the transmitting means.

Further, when the acting member is fixed to a pair of moving members in the perpendicular direction, which are movably engaged with the pair of rails for moving in the perpendicular direction, and then the moving members are provided on the movable member, the movable member and the acting member can be moved in the X-direction and Y-direction with the reliability of home-positioning being held, respectively.

Particularly, when this home-positioning apparatus is applied to the chip mounter, dispenser or the like, the accuracy of home-positioning in the X-direction and Y-direction can be improved and the accuracy of positioning with high reliability can be obtained in the movement of the head of the chip mounter, dispenser or the like.

DETAILED DESCRIPTION OF THE INVENTION

Detailed description will hereunder be given of one embodiment of the present invention.

Figure 1:
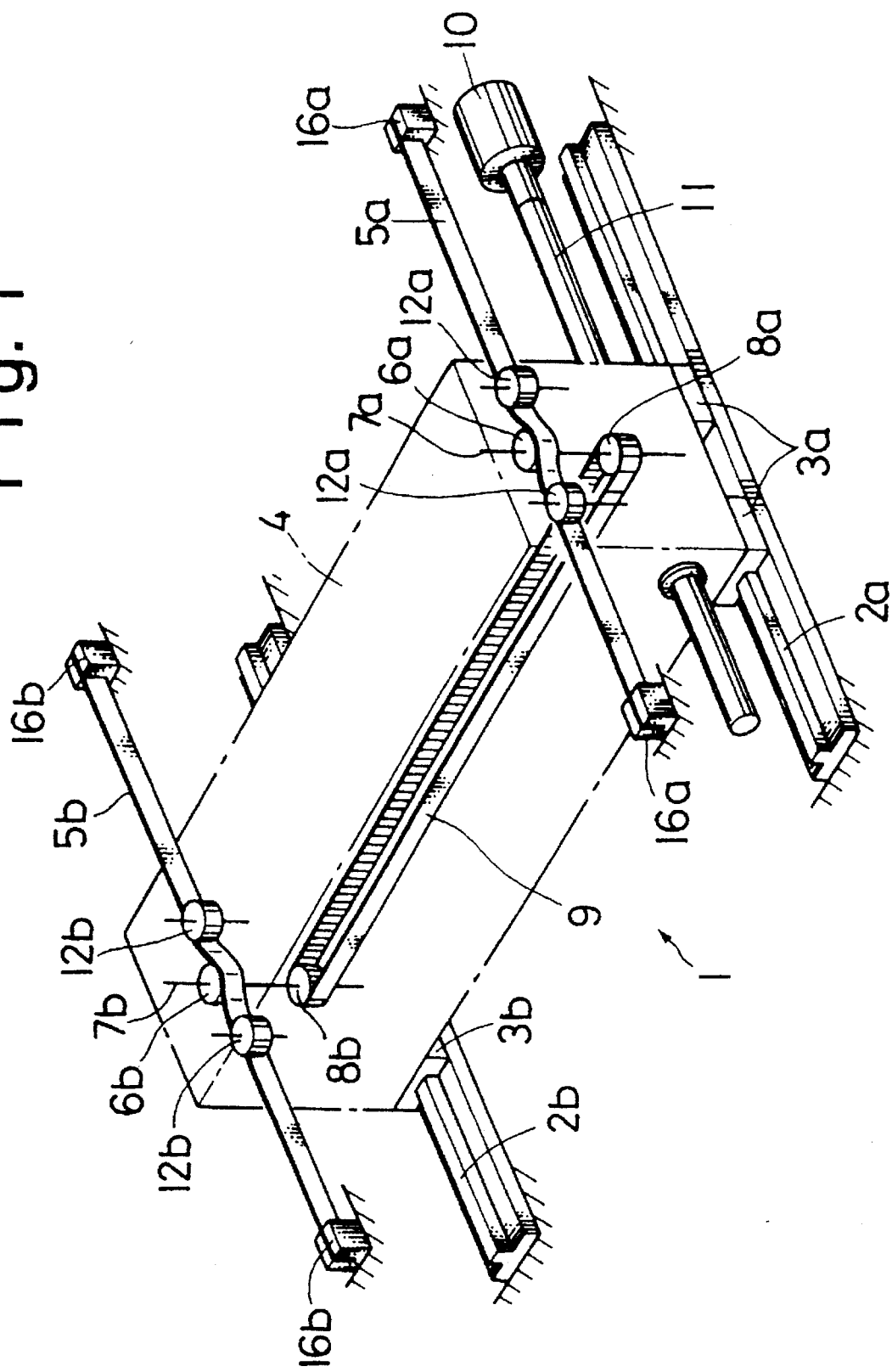
FIG. 1 is a schematic block diagram showing one embodiment of the equalizing mechanism in a home-positioning apparatus according to the present invention.

FIG. 1 is the schematic block diagram showing one embodiment of the equalizing mechanism in a home-positioning apparatus according to the present invention.

Firstly, description will be given of the schematic construction of the equalizing mechanism in the home-positioning apparatus in this embodiment with reference to FIG. 1.

The equalizing mechanism in the home-positioning apparatus is applied to an X-Y home-positioning apparatus for example, and includes:

a pair of rails for moving 2a and 2b provided on a base 1;

a pair of saddles (moving members) 3a and 3b movably engaged with the pair of rails for moving 2a and 2b;

a movable beam (movable member) 4 fixed to the pair of saddles 3a and 3b;

a pair of timing belts (transmitting means) 5a and 5b, respective opposite ends of which are fixed, and laid in parallel to the rails 2a and 2b;

a pair of timing pulleys (engageable means) 6a and 6b rotatably supported on the movable beam 4 and engaged therewith between the fixed ends of the pair of timing belts 5a and 5b;

a pair of timing pulleys for interlocking (engageable means for interlocking) 8a and 8b fastened to shafts 7a and 7b of the pair of timing pulleys 6a and 6b; and a timing belt for interlocking (transmitting means for interlocking) 9 racked between the pair of timing pulleys for interlocking 8a and 8b.

In this movable beam 4, in order to drive the movable beam 4 along the pair of rails 2a and 2b, a ball screw (driving means) 11 driven by a servo-motor 10 is provided only on one side of the pair of rails for moving 2a and 2b. A pair of idle pulleys (tensile means) 12a and 12b for strong engagement between the pair of timing belts 5a and 5b and the pair of timing pulleys 6a and 6b are provided in the laying direction of the timing belts 5a and 5b, interposing the respective timing pulleys 6a and 6b therebetween.

In this equalizing mechanism, when the movable beam 4 is driven along the pair of rails 2a and 2b, the driving force given by the rotation of one 6a of the timing pulleys engaged with one 5a of the timing belts for example is adapted to be equalized and transmitted to the other 6a of the timing pulleys engaged with the other 5b of the timing belts through one 8a of the timing pulleys for interlocking, the timing belt 9 for interlocking and the other 8b of the timing pulleys for interlocking.

Figure 2:
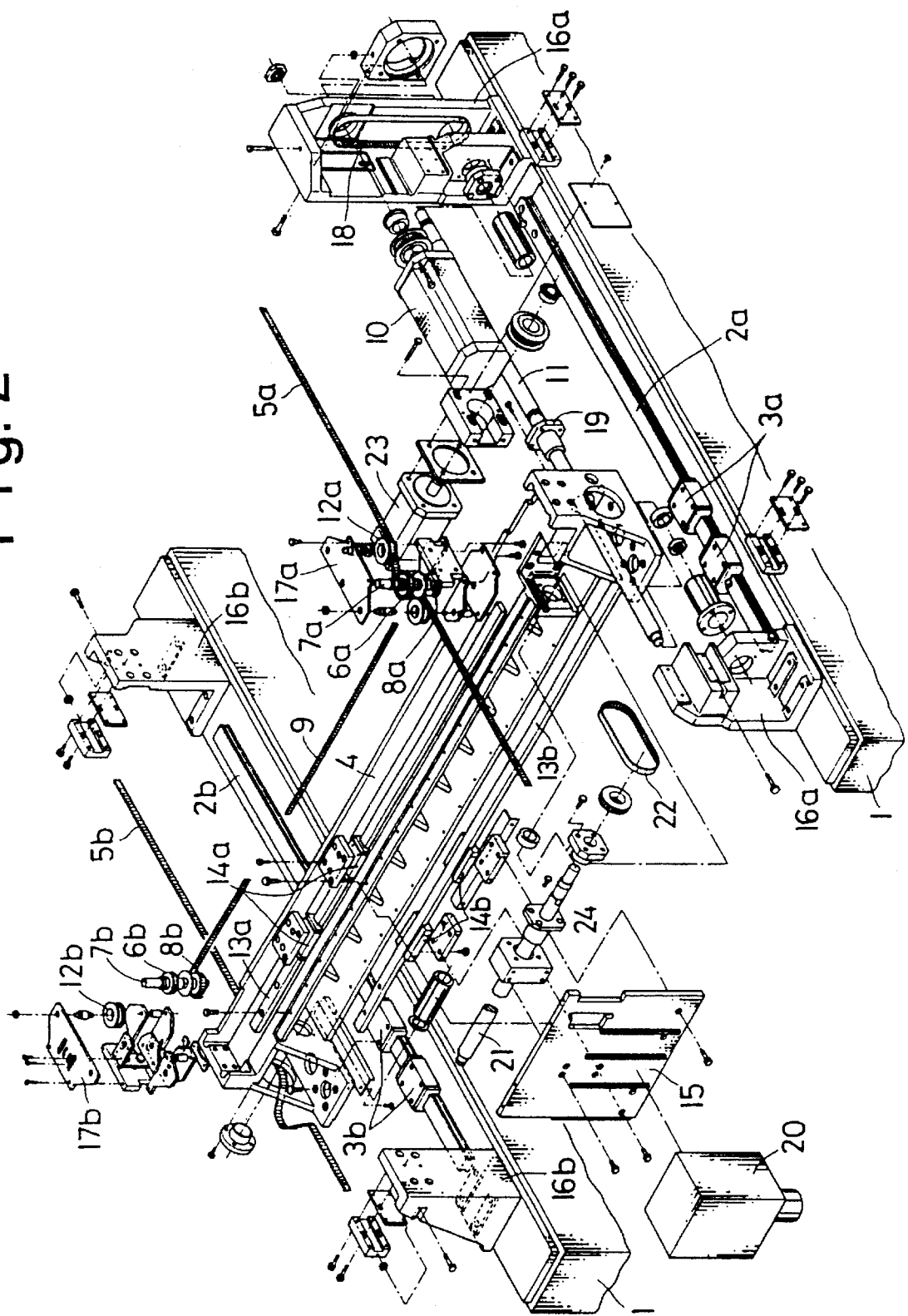
FIG. 2 is an assembly drawing showing the essential portions of the chip mounter, to which is applied the equalizing mechanism in this embodiment.

The above-described equalizing mechanism is applied to an X-Y home-positing apparatus of the chip mounter for example. As shown in FIG. 2, in this mechanism, for example, as the pair of timing belts 5a and 5b and the timing belt 9 for interlocking, the transmitting means having no slip and backlash are used, as the pair of timing pulleys 6a and 6b and the pair of timing pulleys for interlocking 8a and 8b, the engageable means engaged with the timing belts 5a and 5b and the timing belt for interlocking 9 are used, and further, as the pair of idle pulleys 12a and 12b, the tensile means for strong engagement are used.

As the servo-motor 10 for driving the ball screw 11, a driving means rotatably controlled with high accuracy by a numerically controlling means, not shown, is used, and further, as the saddles 3a and 3b movably engaged with the pair of rails for moving 2a and 2b, the moving members capable of driving linearly by the linear bearings are used. With this arrangement, the movable member as being the movable beam 4 can be moved and home-positioned in, the Y-direction.

As shown in FIG. 2, for the movement in the X-direction, on the removable beam 4, there are provided a pair of rails for moving in the perpendicular direction 13a and 13b disposed in parallel in a direction perpendicular to the moving direction of this movable beam 4, saddles (moving members in the perpendicular direction) 14a and 14b including a pair of linear bearings movably engaged with the pair of rails for moving in the perpendicular direction, and a carriage (acting member) 15 fixed to the pair of saddles 14a and 14b, so that this carriage 15 can be moved and home-positioned in the X-direction in the movable beam 4.

Detailed description will be given of the arrangement of the home-positioning apparatus using the equalizing mechanism which is applied to the chip mounter, through the equalizing mechanism which is the feature of the present invention in particular, and further, the moving mechanism with reference to the assembly drawing in FIG. 2 and the partial detailed drawings in FIG. 3 through 5.

On the base 1 of the chip mounter, the pair of rails for moving 2a and 2b are provided at the opposite ends in the longitudinal direction of the movable beam 4 in the Y-direction, respectively, and the end portions of the movable beam 4 are fixed to the pair of saddles 3a and 3b movably engaged with the rails for moving 2a and 2b, respectively.

Figure 3:
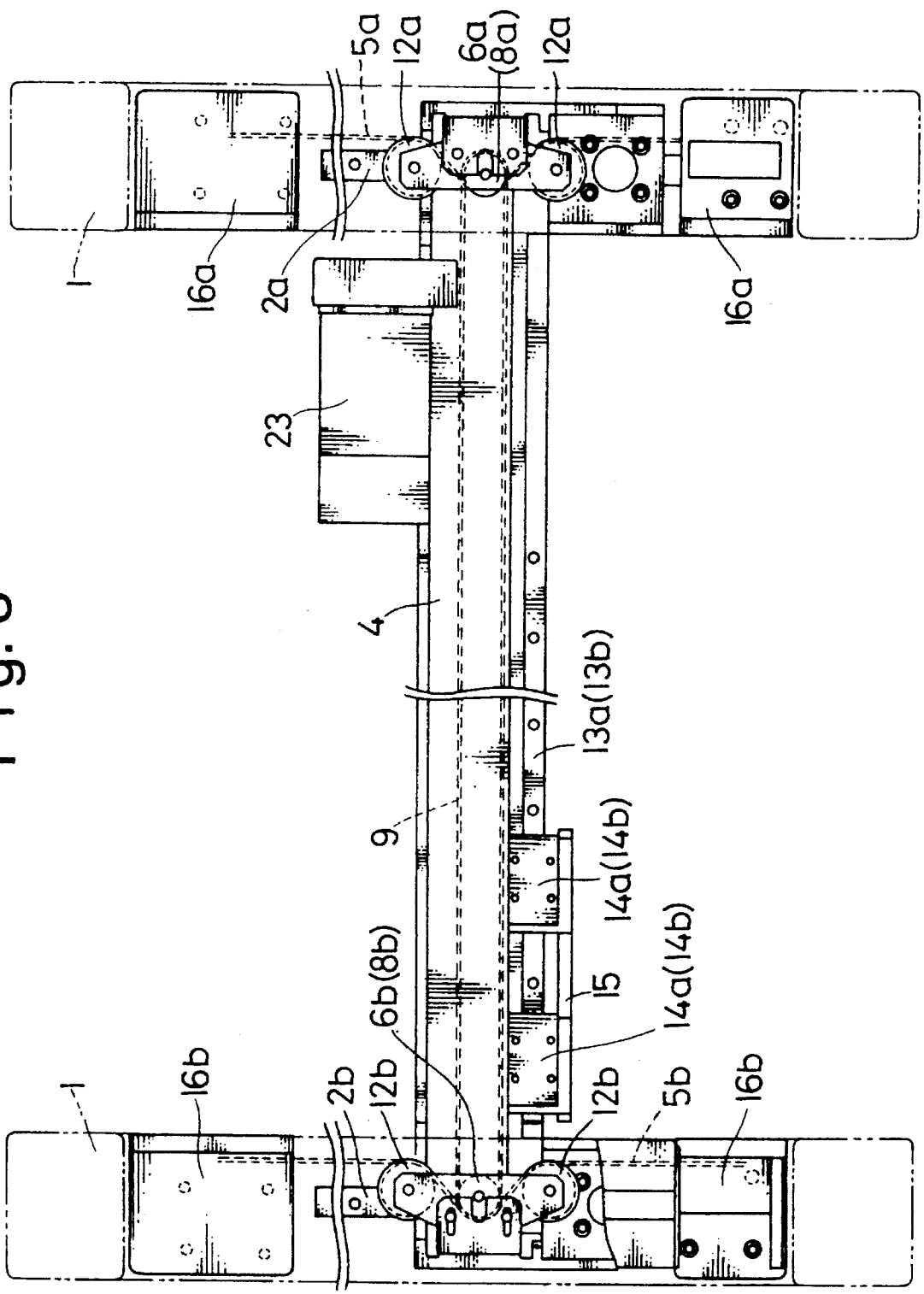
FIG. 3 is a plan view showing a movable beam portion in this embodiment.
Figure 4:
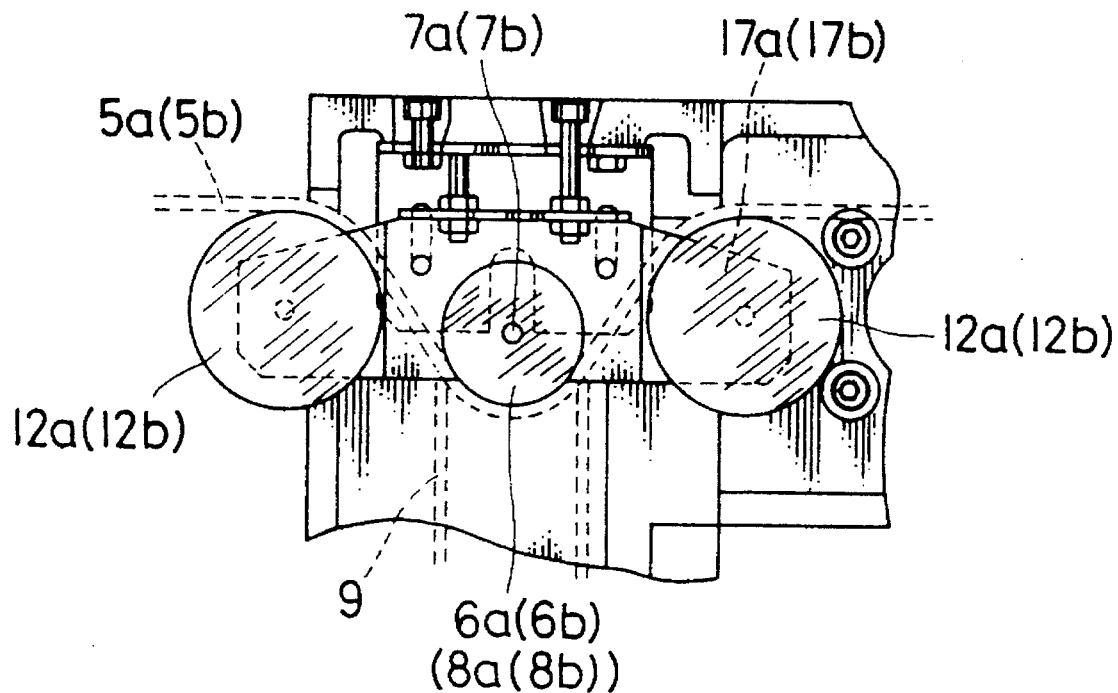
FIG. 4(a) is a plan view showing the construction of engagement between the timing pulleys and the timing belts and FIG. 4(b) is a front view showing a partial cross-section of the construction of engagement between the timing pulleys and the timing belts, in this embodiment.
Figure 4:
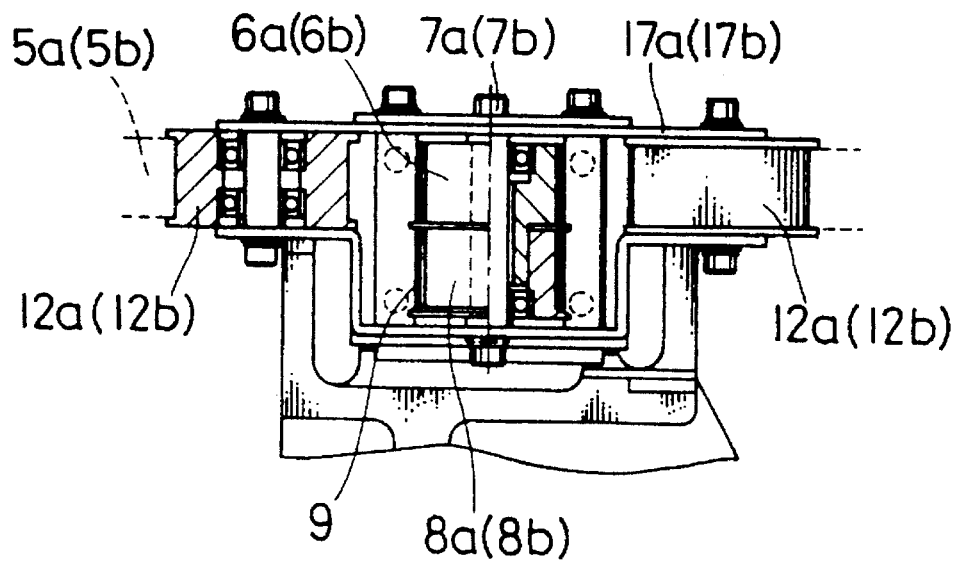

The timing belt 5a, which has the respective opposite ends fixed to a fixed base 16a, is laid in parallel to the rail 2a at the driving side as being one of the end portions of this movable beam 4, i.e., at an upward position of the driving side close to the rail 2a provided at the right side in FIGS. 2 and 3.

The timing pulley 6a is engaged with the timing belt 5a between the fixed ends thereof, the shaft 7a of this timing pulley 6a is rotatably held by a bearing 17a which is fixedly provided in the vicinity of the driving side of the movable beam 4, and the timing pulley for interlocking 8a is mounted at a position downwardly of the timing pulley 6a of this shaft 7a as showing FIG. 4(b) in detail.

The pair of idle pulleys 12a is rotatably supported by bearings 17a, interposing the timing pulley 6a therebetween, in the laying direction of this timing belt 5a as shown in FIG. 4(a) in detail, so that engagement between the timing belt 5a and the timing pulley 6a is made to be strong.

On the other hand, at the opposite side to the driving side also, there are provided symmetrically with the other side of the rail for moving 2b, the timing belt 5b having the opposite ends fixed to the fixed base 16b, the timing pulley 6b engaged with the timing belt 5b, the shaft 7b of the timing pulley 6b held by the bearing 17b, the timing pulley for interlocking 8b fastened to the shaft 7b of the timing pulley 6b, and a pair of idle pulleys 12b interposing the timing pulley 6b, having the construction similar to the mechanism on the above-described driving side.

The above-described driving side and the opposite side are interlocked with each other and driven in synchronism by the timing belt for interlocking 9 racked between the timing pulleys for interlocking 8a and 8b through the equalized driving force between the driving side and the opposite side.

As a driving source for movement in the Y-direction, the ball screw 11 is used, which is disposed in parallel to the rail for moving 2a on the driving side and rotatably coupled to the driving side of the movable beam 4. The servo-motor 10 is also used as the driving source for rotating this ball screw 11 through a belt 18. A nut 19 of the ball screw 11 is fixedly mounted to the end portion of the movable beam 4 on the driving side.

The servo-motor 10 is rotated with high accuracy by the numerical control and the driving side of the movable beam 4 is driven by the rotation of the ball screw 11, so that the movable beam 4 can be moved and home-positioned in the Y-direction.

Figure 5:
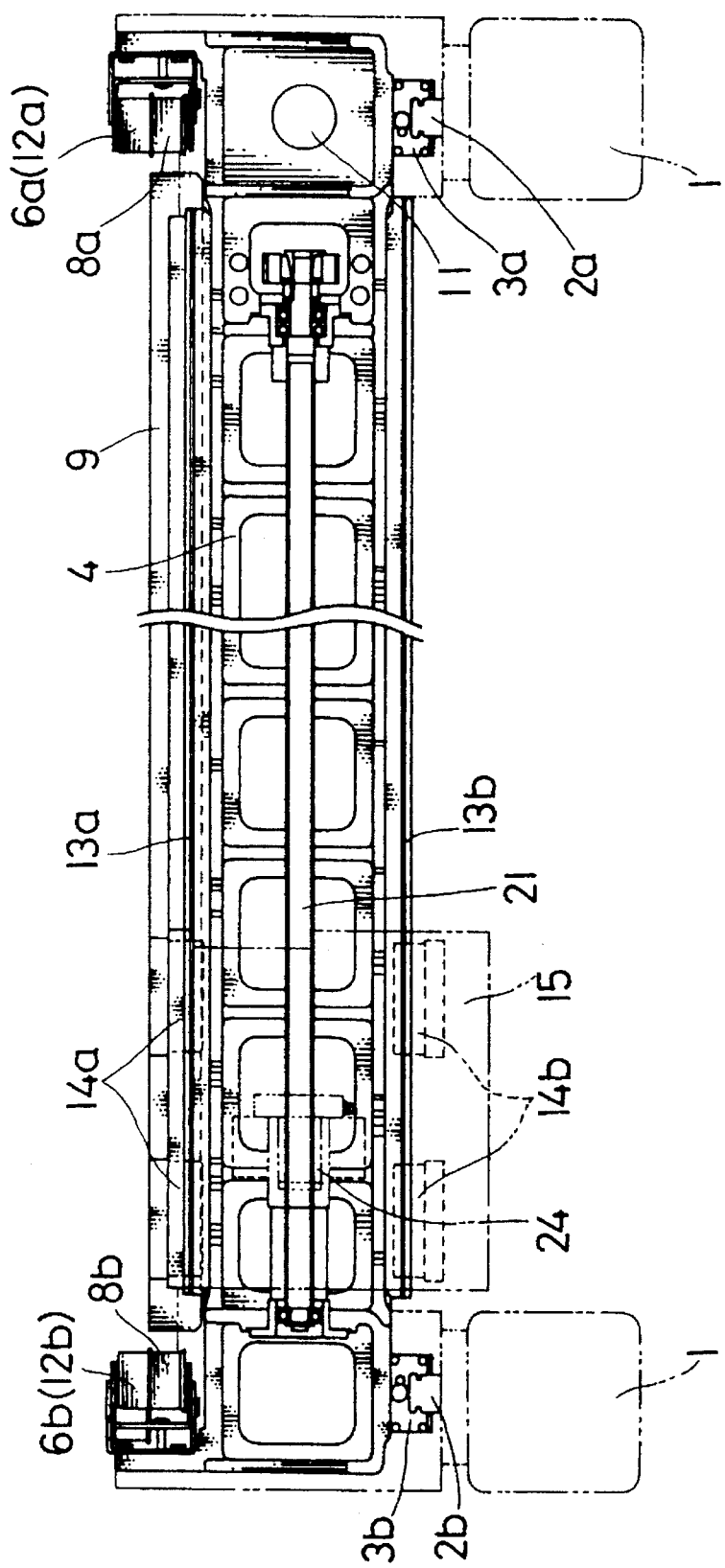
FIG. 5 is a front view showing the movable beam portion in this embodiment.

On the other hand, the moving mechanism in the Y-direction is provided in the movable beam 4 as shown in detail in FIG. 2 and further in FIG. 5. The pair of rails for moving in the perpendicular direction 13a and 13b are provided at positions above and below the movable beam 4 in the perpendicular direction to the moving direction of the movable beam 4, i.e., the longitudinal direction of the movable beam 4. The pair of saddles 14a and 14b including the linear bearings are movably engaged with the respective rails for moving in the perpendicular direction 13a and 13b.

The carriage 15 is fixed to the pair of saddles 14a and 14b and can move in the X-direction in the movable beam. A parts mounting head 20 of the chip mounter is fixed to the carriage 15 and can be moved and home-positioned in the X-direction in the movable beam 4.

As the driving source in the X-direction, similarly to the driving in the Y-direction, there are used a ball screw 21, a servo-motor 23 for rotating this ball screw 21 through a belt 22, and a nut 24 of the ball screw 21, by which the ball screw 21 is fixedly mounted on the carriage 15. The ball screw 21 is disposed between the pair of rails for moving in the perpendicular direction 13a and 13b in parallel thereto and rotatably coupled to the opposite end portions of the movable beam 4.

The servo-motor 23 is rotated with high accuracy by a numerically controlled means, not shown, and the carriage 15 is driven by the rotation of the ball screw 21, so that the carriage 15 can be moved and home-positioned in the X-direction.

As a result, the parts mounting head 20 fixed to the carriage 15 is moved and home-positioned by the numerical control in the X-direction and Y-direction, and a relative position thereof to a print circuit board positioned on the base 1 of the chip mounter by another means, not shown, is determined, so that operations such as the mounting of the parts can be performed.

Subsequently, as for the action of this embodiment, description will be given of the operation, in which the movable beam 4 and the carriage 15 are moved and home-positioned in the X-direction and Y-direction, respectively.

Firstly, as for the driving in the Y-direction, when the servo-motor 10 rotates the ball screw 11, the nut 19 fixed to the movable beam 4 is enforced to move the movable beam 4 by the thrust force of the ball screw 11, whereby the movable beam 4 can be moved in the Y-direction along the pair of rails for moving 2a and 2b by the driving force which acts on the driving side of the movable beam 4.

Simultaneously, the timing pulley 6a, in which the shaft 7a thereof tends to move together with the movable beam 4, generates a turning force by the timing belt 5a, the opposite ends of which are fixed. This turning force is transmitted to the timing pulley 6b on the opposite side to the driving side through the timing pulley for interlocking 8a, the timing belt for interlocking 9 and the timing pulley for interlocking 8b on the opposite side to the driving side.

At the opposite side to the driving side, a force in the Y-direction is generated between the timing belt 5b, the opposite ends of which are fixed, and the timing pulley 6b by the rotation of the timing pulley 6b, so that also the opposite side to the driving side of the movable beam 4 can be driven in synchronism with the driving side.

With this arrangement, as for the driving in the Y-direction, the equalizing mechanism for equalizing the driving force can be obtained, so that the load imposed on the linear bearings and the like can be reduced without the high moment as in the prior art being applied to the driving side.

Moreover, in the construction, the rotation (rocking) of the movable beam 4 in the horizontal plane is regulated completely, and there is not generated any turning force in the horizontal plane by the acceleration during the moving and home-positioning as in the prior art, so that the perpendicularity high in accuracy to the moving direction of the movable beam 4 can be obtained.

Even when the carriage 15 and the parts mounting head 20 are moved in the X-direction, if the servo-motor 23 rotates the ball screw 21 firstly in the same manner as in the movement in the Y-direction, then the thrust force of the ball screw 21 is applied to the nut 24 fixed to the carriage 15, so that the carriage 15 can be moved in the X-direction along the pair of rails for moving in the perpendicular direction 13a and 13b.

As for the driving in the X-direction, since there is no need for moving the movable beam 4 and the like which are heavy in weight as in driving in the Y-direction and then no need for increasing the intervals between the pair of rails for moving in the perpendicular direction 13a and 13b, the home-positioning high in accuracy can be obtained without the equalizing mechanism.

According to the equalizing mechanism in the home-positioning apparatus in this embodiment, the pair of timing belts 5a and 5b, the pair of timing pulleys 6a and 6b and the pair of timing pulleys for interlocking 8a and 8b are arranged symmetrically with one another, and the simple and inexpensive construction is adopted in which the timing belt for interlocking 9 is racked between the pair of timing pulleys for interlocking 8a and 8b, so that, even when only one side of the movable beam 4 is driven, the both sides of the movable beam 4 can be driven by the equalized driving force, and the movable beam 4 can be driven without impairing the perpendicularity in the moving of the movable beam 4.

Furthermore, each of the pair of idle pulleys 12a and 12b are laid, interposing the timing pulleys 6a and 6b therebetween, so that engagement between the timing belts 5a and 5b and the timing pulleys 6a and 6b can be made to be strong and that the movable beam 4 can be driven by applying thereto a tension of a predetermined value.

Further, in the movable beam 4, there is provided an X-direction driving mechanism including the pair of rails for moving in the perpendicular direction 13a and 13b, saddles 14a and 14b, and the carriage 15 fixed to the saddles 14a and 14b, so that, when the application is made to the chip mounter as in this embodiment, the parts mounting head 20 of the chip mounter can be moved and home-positioned in the X-direction and Y-direction and a high accuracy of positioning can be obtained.

The invention made by the inventors of the present invention has been described hereinabove in detail with reference to the embodiment, however, the present invention should not necessarily be limited to the above embodiment, and, it is needless to say that the present invention may be variously modified within the limit of not departing from the technical gist.

For example, as for the equalizing mechanism in the home-positioning apparatus in this embodiment, description has been given of the case where the equalizing mechanism is used for the X-Y home-positioning apparatus of the chip mounter, however, the present invention should not necessarily be limited to the above embodiment. The present invention may be widely applied to an X-direction and Y-direction home-positioning apparatus of a dispenser on the like, and may be satisfactorily applied to a case where a movable member having a weight in some extent is driven by one side driving in view of the construction.

Furthermore, in this embodiment, description has been given of the case where the timing belts are used as the pair of transmitting means and the transmitting means for interlocking, the timing pulleys are used as the pair of engageable means and the pair of engageable means for interlocking, and further, the ball screw driven by the servo-motor as the driving means, however, it is needless to say that the case is not limited to this.

Further, the shapes, arrangements and quantities of the component parts and the construction of mounting between the component parts are not limited to those shown in FIGS. 2 through 5, and may be modified variously.

The following is the brief description of the effects obtained by typical ones out of the inventions disclosed in the present application:

(1) The equalizing mechanism ms provided in which the pair of transmitting means, the pair of engageable means, the pair of engageable means for interlocking and the transmitting means for interlocking are symmetrically provided on the pair of rails for moving, whereby, even in the case of driving by only one side of the movable member by the driving means, the driving given by the rotation of one of the engageable means, which is engaged with one of the transmitting means, can be equalized to be transmitted to the other of engageable means, which is engaged with the other of the transmitting means, so that driving of the movable member with high reliability by the equalized driving force can be performed with the perpendicularity of the movable member being held.

(2) By the above item (1), the equalized driving force is applied to the both sides of the movable member, so that the moment applied to the moving members supporting the movable member can be suppressed and, particularly, the load serving as the large obstruction to making of higher speed can he decreased.

(3) By the above item (1), both the equalizing mechanism for equalizing the driving force and the mechanism for completely regulating the rotation of the movable member in the horizontal plane can be obtained, so that the home-positioning apparatus of high accuracy can be realized simply and inexpensively.

(4) In the above item (1), when the pair of tensile means are provided in the respective laying directions of the pair of transmitting means between the pair of transmitting means and the pair of engageable means, interposing the pair of engageable means, engagement between the transmitting means and the engageable means can be made to be strong by the pair of tensile means, so that the movable member can be driven with high reliability by applying the tension of a predetermined value to the transmitting means.

(5) In the above item (1), when the pair of rails for moving in the perpendicular direction are provided in parallel to the perpendicular direction to the moving direction of the movable member, and when the acting member is fixed to the pair of moving members in the perpendicular direction, which are movably engaged with the pair of rails for moving in the perpendicular direction, the movable member and the acting member can be moved in the X-direction and Y-direction, respectively, so that driving with high reliability as the X-Y home-positioning apparatus can be performed.

(6) In the above item (1), when, particularly, the head of the chip mounter, dispenser or the like is fixed to the acting member, and when the home-positioning apparatus is used for the chip mounter or the dispenser, the head of the chip mounter, dispenser or the like can be moved and home positioned in the X-direction and Y-direction by the numerical control, the accuracy of home-positioning can be improved, and the accuracy of positioning with high reliability can be secured.

What is claimed is:

1. An equalizing mechanism in a home-positioning apparatus, comprising:

a pair of rails for moving;

a pair of moving members movably engaged with said pair of rails;

a movable member positioned by said pair of moving members and fixed to said pair of moving members;

a pair of parallel transmitting means, having respective fixed ends, disposed in parallel along said pair of rails and having no slip or backlash;

a first pair of engageable means each of said first pair of engageable means rotatably supported on said movable member and engaged with one of said pair of parallel transmitting means between respective fixed ends of one of said pair of parallel transmitting means;

a second pair of engageable means for interlocking;

a pair of shafts, one of said pair of shafts being fixed to one of said first pair of engageable means and to one of said second pair of engageable means, and the other of said pair of shafts being fixed to the other of said first pair of engageable means and to the other said second pair of engageable means;

a pair of tensile means for engagement between said pair of parallel transmitting means and said first pair of engageable means; and an interlocking transmitting means, having no slip or backlash, and provided between said second pair of engageable means; wherein:

when said movable member is driven along said pair of rails, a driving force given by the rotation of one of said first pair of engageable means, which is engaged with one of said pair of parallel transmitting means, is equalized to be transmitted to the other of said first pair of engageable means which is engaged with the other of said pair of parallel transmitting means through one of said second pair of engageable means, said transmitting means for interlocking and the other of said second pair engageable means; and wherein said pair of tensile means disposed in the respective laying directions of said pair of parallel transmitting means, and interposing said first pair of engageable means therebetween.

2. The equalizing mechanism in a home-positioning apparatus as set forth in claim 1, wherein, when said movable member is driven along said pair of rails for moving, a driving means is provided in said movable member at one side of said pair of rails.

3. The equalizing mechanism in a home-positioning apparatus as set forth in claim 1, wherein, in said movable member, a pair of parallel rails for moving in perpendicular direction are provided in the direction perpendicular to the moving direction of said movable member, a pair of moving members in perpendicular direction are movably engaged with said pair of rails for moving in the perpendicular direction, respectively, an acting member is fixed to said pair of moving members in the perpendicular direction, whereby said movable member and said acting member are made movable in the X-direction and Y-direction.

4. The equalizing mechanism in a home-positioning apparatus as set forth in claim 1, wherein said pair of parallel transmitting means and said transmitting means for interlocking are formed of timing belts, said first pair of engageable means and said second pair of engageable means are engaged with said timing belts and formed of timing pulleys having no slip and backlash, and said driving means is formed of a ball screw driven by a servo-motor.

5. The equalizing mechanism in a home-positioning apparatus as set forth in claim 3, wherein a head of a chip mounter or a head of a dispenser is fixed to said acting member, and the head of the chip mounter or the head of the dispenser is moved and home-positioned in the X-direction and Y-direction by numerical control.

* * * * *